(12) United States Patent
Cashman et al.

(10) Patent No.: US 6,826,400 B1
(45) Date of Patent: Nov. 30, 2004

(54) METHOD AND APPARATUS FOR CONCURRENT MONITORING OF DIVERGENT WIRELESS TELECOMMUNICATION SYSTEMS

(75) Inventors: Russell P. Cashman, Vista, CA (US); Richard A. Schwartz, San Diego, CA (US)

(73) Assignee: Pacific Communication Sciences, Inc., Austin, TX (US)

( * ) Notice: Subject to any disclaimer, the term of this patent is extended or adjusted under 35 U.S.C. 154(b) by 1316 days.

(21) Appl. No.: 09/151,580

(22) Filed: Sep. 11, 1998

Related U.S. Application Data

(63) Continuation-in-part of application No. 08/496,282, filed on Jun. 28, 1995, now Pat. No. 5,819,184, which is a continuation-in-part of application No. 08/487,043, filed on Jun. 7, 1995, now Pat. No. 6,334,062.

(51) Int. Cl.[7] .......................... H04Q 7/20; H04M 1/00; H04J 3/06; H04L 12/66
(52) U.S. Cl. ................... 455/434; 455/452.1; 455/551; 455/552.1; 455/553.1; 455/574; 370/329; 370/350; 370/352; 380/48
(58) Field of Search ................................ 455/423, 551, 455/434, 552, 574, 553, 452.1, 552.1, 553.1; 380/48; 370/350, 352, 329

(56) References Cited

U.S. PATENT DOCUMENTS

| | | | | |
|---|---|---|---|---|
| 5,020,091 A | * | 5/1991 | Krolopp et al. | 455/551 |
| 5,119,502 A | * | 6/1992 | Kallin et al. | 455/434 |
| 5,144,668 A | * | 9/1992 | Malek et al. | 380/48 |
| 5,260,988 A | * | 11/1993 | Schellinger et al. | 455/552 |
| 5,363,428 A | * | 11/1994 | Nagashima | 455/452 |
| 5,509,016 A | * | 4/1996 | Muller | 370/350 |
| 5,533,019 A | * | 7/1996 | Jayapalan | 370/352 |
| 5,533,029 A | * | 7/1996 | Gardner | 370/329 |
| 5,768,267 A | * | 6/1998 | Raith et al. | 370/329 |
| 5,806,007 A | * | 9/1998 | Raith et al. | 455/574 |
| 5,819,184 A | * | 10/1998 | Cashman | 455/553 |

OTHER PUBLICATIONS

IBM, "Wireless Emergency Call System", IBM Technical Disclosure Bulletin, 9/94.*
IBM, "External package for Mobile Computer Options", IBM Technical Disclosure Bulletin, 4/95.*
IBM, "Dual Battery Charger for External Notebook Computer Options", IBM Technical Disclosure Bulletin, 4/95.*
Melanchuk, Dupont, Backer, "CDPD and emerging Digital Cellular Systems", Compcon'96, Feb. 25, 1996.*
Lin, Chuang, "Modeling the Sleep Mode for Cellular Digital Packet Data", IEEE Communications Letters, Mar. 1999.*

* cited by examiner

*Primary Examiner*—William Cumming
(74) *Attorney, Agent, or Firm*—Steven Lin, Esq.

(57) ABSTRACT

A portable communications subscriber unit operates as a data transfer terminal as well as an analog cellular telephone M-ES. Two modes of operation, an analog cellular communication mode and a Cellular Digital Packet Data (CDPD) mode, are available in the subscriber unit. The subscriber unit distinguishes between paging signals indicative of a CDPD mode of communication and those indicative of an analog cellular mode of communication. The subscriber unit automatically preempts CDPD communications in favor of analog cellular communications such as those carried out in an AMPS system. The present inventive method enables the subscriber unit to remain registered in the CDPD communication system using a CDPD "sleep mode" while performing activities on the AMPS system. Another aspect of the present invention facilitates the automatic switching of subscriber unit displays to correspond to the communication system with which the unit is presently communicating.

10 Claims, 9 Drawing Sheets

METHOD AND APPARATUS FOR CONCURRENT MONITORING OF DIVERGENT WIRELESS TELECOMMUNICATION SYSTEMS

CROSS REFERENCE TO RELATED APPLICATION

This is a continuation-in-part of Ser. No. 08/496,282, filed Jun. 28, 1995, entitled "Portable Communications and Data Terminal Operating to Optimize Receipt of Both Incoming CDPD and AMPS Messages," now U.S. Pat. No. 5,819,184 which is a continuation-in-part of Ser. No. 08/487,043, filed Jun. 7, 1995, now U.S. Pat. No. 6,334,062 entitled "Portable Communications and Data Terminal Operating to Optimize Receipt of Both Incoming CDPD and AMPS Messages".

BACKGROUND OF THE INVENTION

1. Field of the Invention

This invention relates generally to wireless communication devices, and more particularly to portable subscriber stations operable between two or more divergent wireless communication systems.

2. Description of Related Art

The modern analog cellular system for mobile wireless duplex voice transmission is called "Advanced Mobile Phone Service" (AMPS). The AMPS cellular network uses the FCC assigned carrier frequency range of 800 to 900 MHZ. Automobile-mounted cellular units transmit voice signals to a cellular base station within a given cell using up to one watt of power. Hand-held cellular units using battery power supplies transmit voice signals to a cellular base station within a given cell using up to one quarter watt of transmission power.

The AMPS system was designed to communicate the analog human voice signal. The AMPS system was optimized for carrying as many analog voice signals within a given bandwidth of a channel as possible. Mobility of the cellular telephone using low power mobile units, FM modulation, and a higher carrier frequency range (800 MHZ–900 MHZ) is achieved through a cellular arrangement of base stations whereby a user's signal is handed off to the next cell site as the user moves into a new cell. This cellular hand-off can cause a temporary loss in transmission or reception. However, temporarily losing a voice signal is not critical because a user can easily detect a loss of voice signals and the voice information can be readily retransmitted upon request. However, signal loss, even though temporary, poses special problems for the transmission of digital data. Other examples of inherent AMPS shortcomings which can cause loss in voice signals are diminished signal strength, reflections, Rayleigh fading, and cellular dead spots.

The availability of portable computers has given rise to the desire to conduct wireless transmission of digital data from a remote location. Presently, the AMPS voice cellular system is being used to transmit digital data in the form of circuit-switched cellular data across AMPS carrier channels. Raw (baseband) digital data must first be converted so that it can be transmitted and received using the analog AMPS system. The baud rates available using an AMPS system disadvantageously is, limited due to inherently narrow channel bandwidths and transmission errors.

Heretofore, providing efficient wireless communication of both voice and data signals in an integrated package has been difficult. It has been difficult to integrate the features of AMPS voice transmission with applications such as data transmission, electronic mail, duplex paging, as well as the provision of a circuit-switched cellular data interface such as a wireless fax-modem, into a single hand-held battery operated wireless unit. Some degree of integration of these functions has been facilitated by the development of the Cellular Digital Packet Data (CDPD) system described in the CDPD specification, Version 1.1, hereinafter referred to as the "CDPD Specification". The CDPD communication system shares the same carrier frequencies assigned to the AMPS channels as described in Part 405, Version 1.1 of the CDPD specification. The base unit or mobile data base station (MDBS 1, as illustrated in FIG. 1), of a CDPD system utilizes a channel within an AMPS cell to establish a link and to communicate with a user's mobile end system (M-ES 2). The MDBS 1 may use frequencies outside the scope of the AMPS frequencies. The M-ES 2 may be a portable computer, hand-set or some other portable electronic device containing a communication unit. The MDBS 1 serves as a communication link between the user of the M-ES 2 and a service provider's network of wire lines, microwave links, satellite links, AMPS cellular links, and other CDPD links. For example, the MDBS 1 facilitates communication between the M-ES 2 and a mobile data intermediate system (MD-IS) 3, intermediate systems 4, 5, 6 to convey data to another mobile end system, computer network, or non-mobile or fixed end-user system (e.g. F-ES 7, 8).

As described in the CDPD specification, the CDPD network is designated to operate as an extension and overlay of existing communication networks, such as AMPS networks and the Internet. From the mobile subscriber's perspective, the CDPD network is a wireless mobile extension of traditional networks. The CDPD network shares the transmission facilities of existing AMPS networks and provides a non-intrusive, packet-switched data service that does not impact AMPS service. In effect, the CDPD network is entirely transparent to the AMPS network.

As defined in the CDPD specification, the CDPD system employs connectionless network services (CLNS) in which the network routes each data packet individually based on the destination address carried in the packet and knowledge of current network topology. The packetized nature of the data transmissions from an M-ES allows many CDPD users to share a common channel, accessing the channel only when they have data to send and otherwise leaving it available to other CDPD users. The multiple access nature of the system makes it possible to provide substantial CDPD coverage simultaneously to many users with the installation of only one CDPD station in a given sector (transmitting range and area of a standard AMPS base station transceiver).

The airlink interface portion of the CDPD network comprises a set of cells. A cell is defined by the geographical boundaries within the RF transmission range from a fixed transmission site such as MDBS 1, which can be received at acceptable levels of signal strength by mobile subscribers such as M-ES 2. The transmitter supporting the cell may be located centrally within the cell, with transmission being carried out via an omni-directional antenna, or the transmitter located at the edge of a cell and transmitted via a directional antenna to cover just a portion of the cell. This portion of the second type of cell is referred to as a sector. In typical configurations, the transmitters for several sectors are co-located. The area served by a set of cells has some area overlap so that a roaming mobile end system can maintain continuous service by switching from one cell to an adjacent cell in a manner roughly analogous to the standard hand-off in the AMPS system. The two cells are considered to be adjacent if an M-ES can maintain continuous service by switching from one cell to the other. This switching process, called cell transfer, is done independently of normal AMPS hand-off procedures.

In FIG. 1 the interface (A) between the M-ES 2 and the MDBS 1 is an "air interface" constituted by a radio frequency link using standard AMPS frequencies. The MDBS 1 is connected to other mobile data base stations through a mobile data intermediate system (MD-IS) 3. A plurality of mobile data base stations can be controlled by a single MD-IS. The MD-ISs are connected to each other through intermediate systems such as system 4 and system 5 in FIG. 1.

The intermediate systems comprise at least one node connected to more than one sub-network (e.g., MD-IS 3). The intermediate system has a primary role of forwarding data from one sub-network to another. Specifically, the MD-IS 3 performs data packet routing based on knowledge of the current location of each mobile end system within the range of the mobile data base stations under the control of the MD-IS. The MD-IS is the only network entity that has knowledge of the location of any of the mobile end systems. However, under some circumstances (as defined in the CDPD specification) particular mobile data base stations track the behavior of specific subscriber stations. A CDPD-specific Mobile Network Location Protocol (MNLP) is operated between each MD-IS (through the intermediate system) to exchange location information regarding the mobile end systems.

The overall CDPD network is controlled by a network management system (NMS) 10 having an interface with at least one mobile data intermediate system 3. Using a special protocol programming instructions can be transmitted from the NMS 10 through the MD-IS 3 to any number of mobile data base stations under proper conditions.

Such programming instructions can be used to convey useful network data to the MDBS, as well as configuring the operation of an MDBS with respect to such critical features as maintaining channel queues. The NMS also controls other CDPD system characteristics such as the timing of paging messages to coincide with the non-dormant periods of the M-ES hand-sets. One advantage of the subject CDPD system is the capability of providing operating instructions to mobile data base stations from the NMS 10 through an MD-IS 3, or by a direct connection to the MDBS as is outlined in the detailed description of the MDBS architecture found in the CDPD specification, Parts 402 and 403.

FIG. 2 depicts a comparison between the CDPD network illustrated in FIG. 1 and the standard AMPS network. The MDBS 1 is the CDPD equivalent to an AMPS base station 21. Both serve as links to mobile users, 2, 2', and 2" for the CDPD system and 22, 22' and 22" for AMPS users. Both AMPS and CDPD functions can be handled by the same hand-set or end system equipment. Also, the MDBS 1 is preferably located with the AMPS base station 21 as is described hereinbelow in greater detail.

The MD-IS 3 acts as a local controller of the CDPD mobile data base stations which are connected thereto. The MD-IS 3 is analogous to the mobile telephone switch office (MTSO) 23 which is used to control a plurality of AMPS base stations 21, 21' and 21". In the AMPS system, the MTSO 23 can be connected to the various base stations 21, 21', 21" by way of communication links, either using dedicated landlines or through a public switched telephone network (PSTN). The connection between the MD-IS 3 and the various mobile data base stations 1, 1', 1" controlled thereby is made in the same manner. However, different signaling protocols are used than those found in the AMPS system.

In contrast to the infrastructure requirements of AMPS, the infrastructure requirements of CDPD are very small. The CDPD base station equipment is preferably located at a cellular carrier's cell site along side existing AMPS base station cellular equipment. The multiple access nature of the CDPD system makes it possible to provide substantial CDPD coverage to many users simultaneously with the installation of only one CDPD radio in a given sector. This multiple access capability is the result of a mobile end-system accessing the CDPD channel only when it has data to transmit.

Referring again to FIG. 2, the AMPS base station and the MDBS can use the same RF equipment if both are co-located. By contrast, the MTSO of the AMPS system and the MD-IS of the CDPD system do not have to be co-located to share RF links. In the AMPS system, the MTSO 23 connects AMPS base stations with a mobile station to another party through a PSTN 24. The intermediate system 4 is to a CDPD system as the PSTN 24 is to an AMPS system. Similar to the AMPS system, the CDPD system must use the public switch telephone network or another landline network to complete calls to remote parties or systems via a phone system terminal network 28. However, the CDPD system uses a different protocol than that used in the AMPS system to complete calls over a PSTN.

The MDBS 1 maintains zero or more (up to the MDBS transmission capability) channel streams across the airlink interface, as directed by the MD-IS which controls the MDBS 1. The MDBS 1 instructs all subscriber units or M-ESs (e.g. 2, 2', 2") to change channels when necessary. For example, the MDBS 1 instructs M-ES 2 to change channels when an AMPS communication is detected on the CDPD channel. Each subscriber unit's terminal stream is carried on one channel stream at a time, normally selected by the mobile subscriber, preferably based upon data received from the MDBS regarding optimum channels for CDPD use. The forward and reverse traffic in a given cell (the terminal stream of the MDBS) is carried over a single DSO trunk, between the MDBS and the MD-IS. Communication between the MDBS and the MD-IS over the DSO trunk uses standard digital transmission formats such as the T1 1.544 Mb/s digital transmission standard.

Digital data is transmitted between the MDBS and the M-ES using Gaussian Minimum Shift Keying (GMSK) modulation. Transmissions from the base station to the M-ES are continuous. Transmissions from an M-ES to an MDBS are sent using a burst mode in which each M-ES accesses a channel only when it has data to send and the channel is not presently being used by other M-ESs. This feature allows multiple mobile subscriber stations or M-ESs to share a single channel. The burst mode of transmission also reduces the M-ES connection time as compared to the connection time required when sending digital data using conventional circuit-switched cellular modems.

Unlike the signaling schemes used by conventional cellular modems, which have been chosen based on the need to operate within the constraints of the existing voice signaling system, the GMSK modulation technique used for CDPD communication was explicitly selected with the intent of obtaining both very high bit transmission rates and very good error performance in cellular channels. The fact that the choice of modulation was not constrained by a preexisting signal structure allows CDPD systems to achieve substantially greater instantaneous bit rates at very low received signal levels when compared to those of conventional cellular modems. This means that CDPD communication systems provide reliable, high speed data transmission in areas where signal quality is inadequate for acceptable cellular modem performance.

The raw (baseband) digital data presently transferred across the CDPD network includes electronic mail messages, digital fax data, and digital data representing a network connection such that files may be transferred as if currently connected to a local area network.

The mobile data intermediate system MD-IS 3 processes the routing of packets for all mobile end systems presently in its serving area. Two services are performed by the MD-IS: a registration service maintaining an information base of each M-ES currently registered in a particular serving location; and a re-address service, decapsulating forwarded packets and routing them to the correct cell. The serving MD-IS also administers authentication, authorization and accounting services for the network support service applications.

In a first mode of operation, a CDPD communication system can operate using dedicated channels which are set aside from a pool of cellular voice channels and reserved for CDPD use. In a second mode of operation, a CDPD communication system can use idle time on channels that are also used by the AMPS system. In this second mode, the mobile data base station can perform "RF sniffing" to determine which channels are available and to detect the onset of voice traffic on the channel currently being used for CDPD communication. If an AMPS cellular unit begins transmitting on a channel occupied by a CDPD transmission, the CDPD unit ceases transmitting on that channel and switches to another available channel (a process called "channel hopping"). If no other channel is available, the CDPD unit ceases transmission until a channel becomes available for CDPD use.

Although the CDPD system shares existing AMPS radio frequency channels, AMPS calls are given the highest priority. AMPS calls are always able to preempt the use of any channel presently being used by CDPD. However, the cellular service provider may opt to dedicate one or more channels for CDPD usage. In this case, AMPS calls will never attempt to pre-empt the channels dedicated to CDPD use.

Typically, the MDBS monitors the activity on AMPS channels during channel hopping. The MDBS maintains a status list (i.e., channels are used for voice or are unused) occupied by voice or unused) for each channel. This status list is available to the CDPD system. The MDBS selects a channel for CDPD use from the unused channels in the list based on a combination of criteria. The criteria can comprise the following: the likelihood that the channel will be required by the voice system in the near future; the interference present on the channel; the interference that the CDPD communication is likely to cause to other voice users in different cells (or on other sectors), and other factors.

The MDBS transmits a list of all the channels which are available for CDPD use to the M-ES's, whether or not currently occupied by voice communication. This list is used by the MDBS when executing a channel hop before the channel is pre-empted by AMPS communication if the MDBS determines that another channel is more suitable. In this case the MDBS sends a message to the M-ESs directing the M-ESs to hop to the specific channel selected. The MDBS then executes a channel hop. Such a channel hop is much more orderly and efficient than an "unplanned" hop because the M-ESs are not required to search for the next channel.

Whenever a CDPD channel is pre-empted by an AMPS communication the MDBS selects another channel from those which are not being used by the AMPS system. The MDBS then immediately hops to the selected unused channel without informing the M-ES (an unplanned hop). The M-ES then determines that the CDPD signal is no longer present on the current channel and searches the other channels in the list to determine the channel (if any) to which the CDPD communication has hopped.

The CDPD system can easily interface to and share equipment with the existing AMPS system. The MDBS must therefore have the ability of physically interfacing with existing AMPS base stations. Consequently, the MDBS is small, non-obtrusive, and easily accessible. The MDBS may be connected easily to equipment which is external to the MDBS which is normally shared with the AMPS system. This external equipment includes an antenna system, RF power amplifiers (in particular, linear amplifiers can be shared with existing AMPS), RF multicouplers, power splitters, duplexers, and other optional AMPS base station equipment. Because the MDBS shares the environment of the AMPS base station, the MDBS must not create a substantial additional burden upon such support systems as environmental control and maintenance. Thus, the MDBS is typically compact and flexible, comprising only those elements necessary for carrying out the CDPD MDBS functions necessary at that cell site.

One of the more demanding technical requirements of the CDPD system is that the ME-S must concurrently monitor the status of both the CDPD and the AMPS communication systems. If the ME-S adheres to the timing of the CDPD system it is possible that some incoming AMPS calls will be missed. This is true, despite the preemptive priority given to AMPS calls versus CDPD communications. And while priority is given to monitoring the AMPS calls, it is probable that a CDPD communication directed to an ME-S will be lost despite the ability of the CDPD system to buffer incoming paging signals for "sleeping" M-ESs. Existing CDPD and AMPS communication systems fail to provide efficient monitoring of both modes of communications to prevent loss of incoming calls.

Accordingly, it is desirable to provide an M-ES which can concurrently monitor communication activities in both the CDPD and AMPS communication systems. The present invention provides such an improved M-ES. Furthermore, it is desirable to automatically switch user displays depending upon the type of communication system with which the user is communicating. The present invention provides an M-ES which has such an automatic display switching capability.

SUMMARY OF THE INVENTION

One advantage of the invention resides in facilitating efficient switching between data communication and voice communication without loss of data communication where voice communication has priority.

The present inventive M-ES provides the advantage of reducing the risk of losing AMPS and CDPD transmissions. Another advantage of the present invention is in efficiently performing a hand-off operation of a wireless subscriber station in a CDPD communication system without losing incoming CDPD or AMPS calls.

These and other advantages of the present invention are achieved by the present inventive M-ES which is arranged for communication with an analog cellular voice communication system and a CDPD communication system, where the M-ES is configured to appear to the CDPD system as if the M-ES is operating in the CDPD mode when in reality M-ES is actually operating in the AMPS mode of communication. In effect, the present inventive M-ES "fools" the CDPD system into registering the ME-S as operating in a CDPD "sleep" mode when, in fact, the M-ES is conducting activities on the AMPS system (e.g., receiving AMPS messages). Thus, using the present inventive method, an M-ES will not be de-registered from the CDPD system when operating in an AMPS mode of communication.

In accordance with one aspect of the present invention, a subscriber station is arranged for communication with a first communication system and a CDPD communication system, where the CDPD system includes a first time adjustment means for selecting a first time interval between consecutive CDPD paging messages which are sent from the CDPD communication system to the wireless subscriber station. The wireless subscriber station or M-ES includes means for requesting communication over the first communication system and means for requesting communication over the CDPD communication system. The subscriber station also has a second time adjusting means for selecting a second time interval starting at a most recent CDPD communication and ending when the wireless subscriber station is expected to enter a CDPD "sleep" mode of operation. The subscriber station also includes means for synchronizing the first and second time intervals to determine the respective CDPD and first communication system operation schedules. The wireless subscriber station uses a means for selecting between operation in the first communication system during the second time interval.

In accordance with the present inventive method and apparatus, the subscriber station operates in the CDPD system as if it is in a CDPD "sleep" mode while in reality the subscriber station operates in an AMPS mode. The inventive subscriber system achieves this advantageous operation by switching between a CDPD mode and an AMPS mode of operation based upon the AMPS paging cycle and the CDPD TEI notification cycle.

This operation is facilitated by a wireless subscriber station arranged for communication with a first communication system and a CDPD communication system where the CDPD communication system includes a first timer means for measuring a first time interval which specifies the time interval between consecutive CDPD paging messages sent from the CDPD communication system to the wireless subscribe station.

The CDPD communication system also includes a second timer means for measuring a second time interval which specifies the time interval between a CDPD system response to a polling signal from the subscriber station and expected entry of the subscriber station into a CDPD "sleep" mode. The subscriber station includes means for requesting communication on the first communication system and on the CDPD communication system, means for measuring the first and the second time intervals, and means for synchronizing the duration of the first and the second time intervals with the CDPD communication system. The wireless subscriber station also includes a means for determining respective CDPD communication and the first communication operation schedules for the subscriber station based upon the first and second time intervals and a paging cycle of the first communication system. Also included are means for selecting operation of one or the other of the means for requesting communication based upon the operating schedules to scan for incoming paging signals on the first communication system while remaining registered on the CDPD system.

In accord with a further aspect of the invention, a method for communicating between a wireless subscriber station and both an analog cellular voice communication system (e.g., AMPS) and a CDPD communication system facilitates a subscriber station configured to monitor both incoming analog cellular voice communications and incoming CDPD communications. The inventive method includes the steps of registering the subscriber station with an analog cellular voice communication system and a CDPD system. The CDPD registration process includes the step of synchronizing a first time interval between the subscriber station and the CDPD system where the first time interval defines when the subscriber station is expected to next be on the CDPD channel. In a next step of the CDPD registration process, the subscriber station is switched from the CDPD channel to an analog cellular voice communication control channel. While operating on the analog cellular control channel, the subscriber station monitors for incoming analog cellular voice communications directed to the subscriber station. In a subsequent step, the subscriber station switches back to the CDPD channel before the end of the first time interval.

In yet another aspect of the present invention, a method for operating a wireless subscriber station in a CDPD system includes selecting at the wireless subscriber station a first time interval beginning at the completion of the most recent CDPD communication between a subscriber station and the CDPD system and ending when the subscriber station is expected to enter a CDPD sleep mode. The wireless subscriber station synchronizes with the CDPD communication system so that both the subscriber station and the CDPD system measure a plurality of second time intervals, wherein the second time intervals selected by the CDPD system define durations of time allowed to the subscriber station before registration. The subscriber station monitors for incoming paging signals on a second communication system channel during the first time interval. The subscriber station also monitors for incoming paging signals on the second communication system during a plurality of second time intervals. The subscriber station changes modes to monitor for incoming CDPD communications on the CDPD channel before expiration of the last of the plurality of second time intervals.

In another aspect of the present invention, the objects of the present invention are achieved by a method of effecting handoff of a wireless subscriber station from a first cell to a second cell of a CDPD communication system. A subscriber station contains a cell transfer database pertaining to the first cell, and registers in the second cell of the CDPD system by sending a polling receiver ready ("RR") signal to an MDBS of the second cell. The subscriber station determines a first time interval for a complete Received Signal Strength Indication (RSSI) scan of the second cell. The subscriber station divides the first time interval into a plurality of overlapping sequential time slots. The subscriber station then alternately scans for CDPD activity and analog cellular voice communication activity on alternating time slots for the duration of the first time interval. The information derived from this scanning process creates a second cell transfer database for the second cell. Once this second cell transfer database has been obtained, the first cell transfer database is discarded.

Yet another aspect of the present invention is directed to a wireless subscriber station arranged for communication with a first communication system and a CDPD communication system. The wireless station includes means for requesting a communication on the first communication system and means for requesting a CDPD communication. The wireless subscriber station also includes means for operating on the first communication system while remaining registered on the CDPD communication system.

An additional aspect of the present invention is directed to a method for communicating between a wireless subscriber station and both a first communication system and a CDPD communication system. The method includes the steps of registering the wireless subscriber station with the first communication system and then registering the wireless system with the CDPD communication system. In the final step the subscriber station tunes to a control channel on the first communication system while still presumed by the CDPD communication system to be on the CDPD channel.

DETAILED DESCRIPTION OF THE INVENTION

Figure 1:
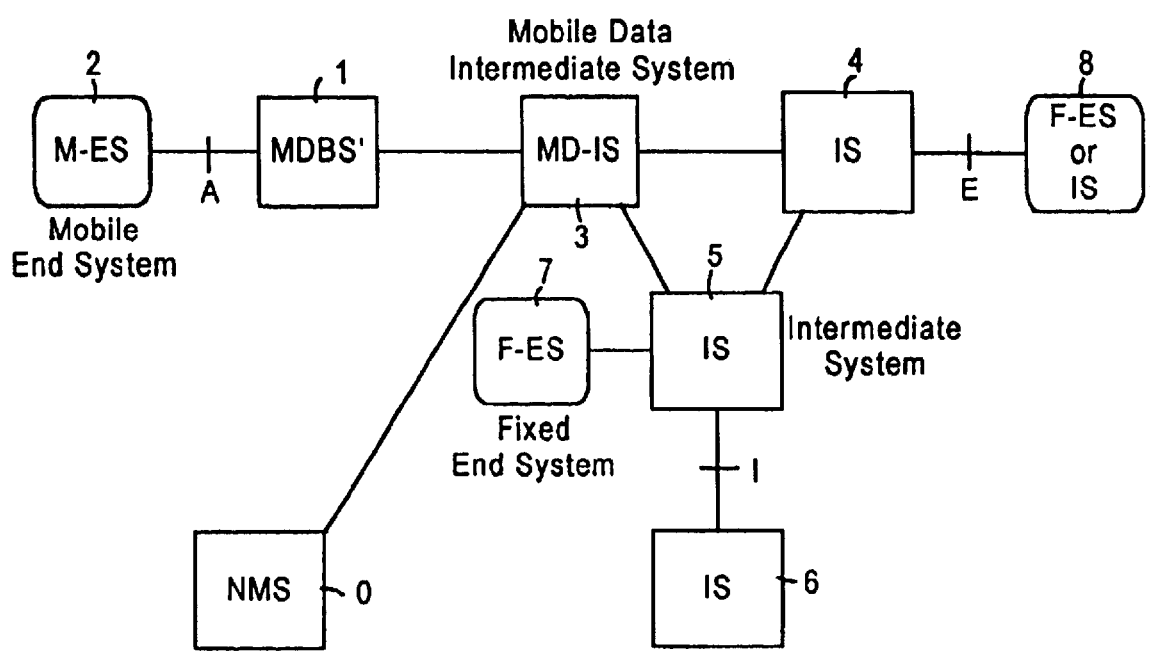
FIG. 1 is a block diagram of a CDPD system.
Figure 2:
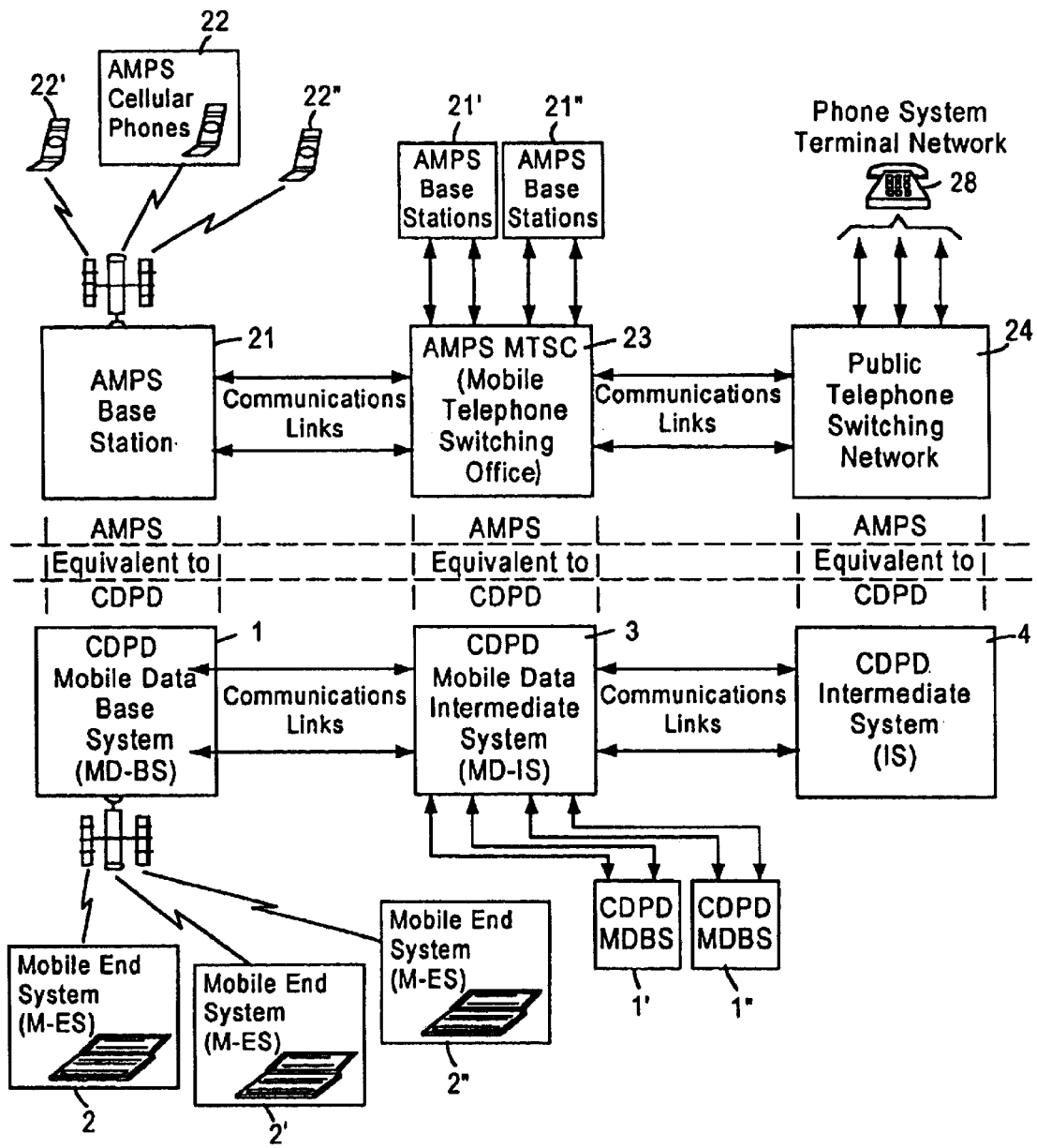
FIG. 2 is a block diagram correlating the CDPD system to an accompanying AMPS system.
Figure 3:
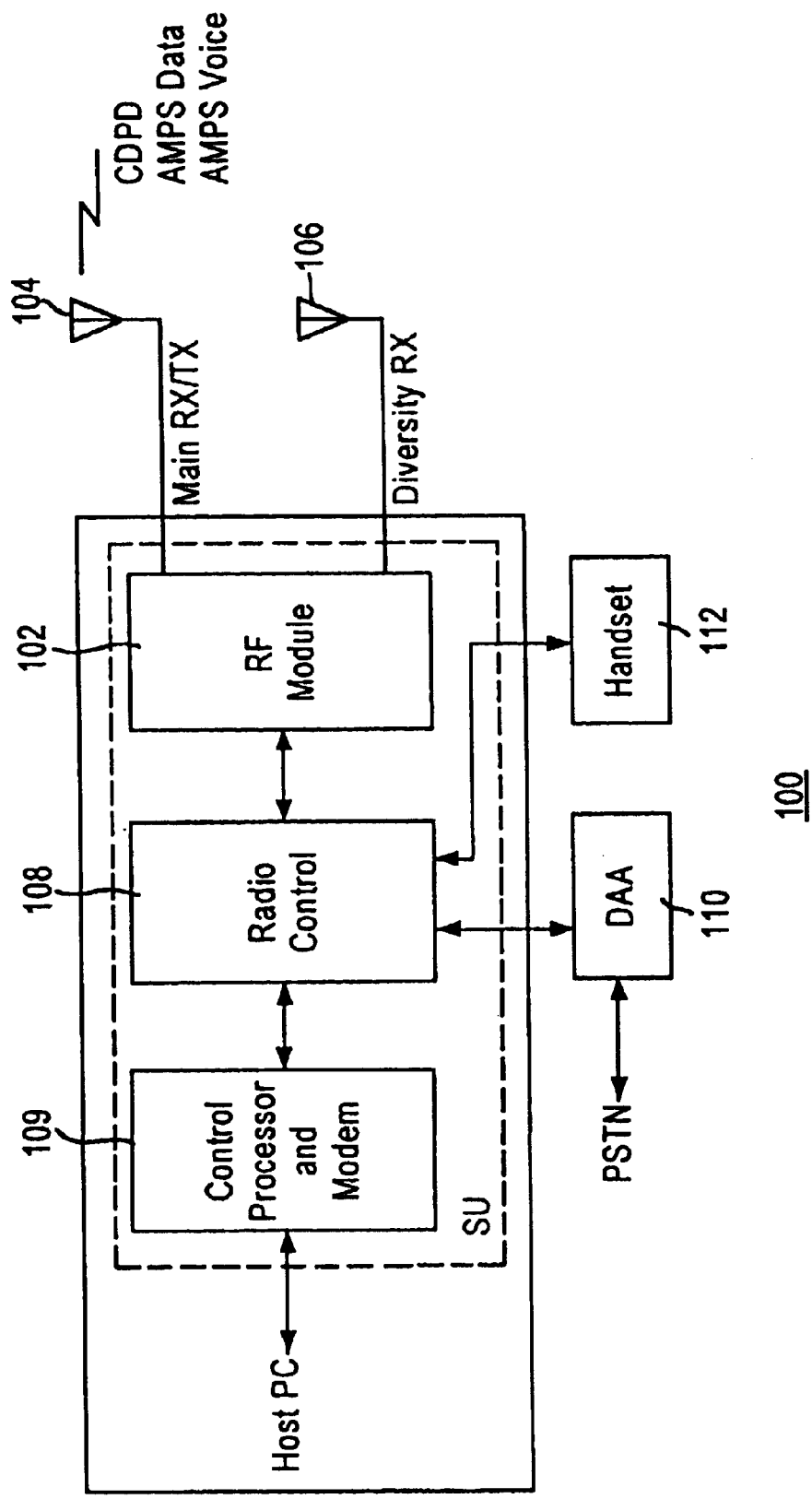
FIG. 3 is a block diagram of a portable radio telephone terminal.

The present invention may be facilitated using the exemplary device shown in FIG. 3. However, the device of FIG. 3 is not necessary to carry out the present invention. Rather, any subscriber station having the capacity to operate in both an AMPS and a CDPD mode of communication can be programmed to benefit from the operation of the present invention. No matter what particular type of handset or subscriber station is used, it must be capable of being programmed to take advantage of certain operations typically carried out between a handset and a CDPD system. These include, but are not limited to, recognition by the handset of the timing (and synchronization therewith) of the various CDPD system operations (such as the notification messages that incoming data is waiting for the selected subscriber station). The subscriber station used to practice the present invention must also be able to request modification of certain parameters of a CDPD system. No modifications need to be made to existing MDBS or MD-IS equipment to practice the present invention of the CDPD communication system.

FIG. 3 shows a block diagram of a portable communication terminal 100 that may be used to practice the present invention. One preferred embodiment of the portable communication terminal 100 is described in commonly assigned co-pending U.S. patent application Ser. No. 08/117,913, filed Sep. 8, 1993, now abandoned in favor of a file wrapper continuation Ser. No. 08/769,036 which is hereby incorporated by reference for its teachings of the terminal. In many respects the portable communication terminal 100 is similar to conventional portable radio telephone handsets in that it includes a radio frequency module 102 having at least one radio frequency transceiver. The radio frequency transceiver uses a main antenna 104 for both receiving and transmitting the various types of signals processed by the portable terminal, such as AMPS data (circuit switched cellular data), AMPS voice communication and CDPD communication. A diversity antenna 106 is used as a backup antenna to maintain reception under certain adverse conditions. A telephone type handset 112 is used to facilitate AMPS voice communications.

The portable terminal can also be connected with a local public switch telephone network (PSTN) using a digital-analog access interface (DAA) 110 which is connected to the radio control processor 108. Processor 108, together with a control processor and modem 109, provide the control functions of the portable terminal including, but not limited to, call setup, high level protocol control, low level protocol control, power adjustment control, modem operation and data transfer between an external host computer. The host computer can alternatively comprise a personal computer (PC), a personal digital assistant (PDA), or other electronic device.

Figure 4:
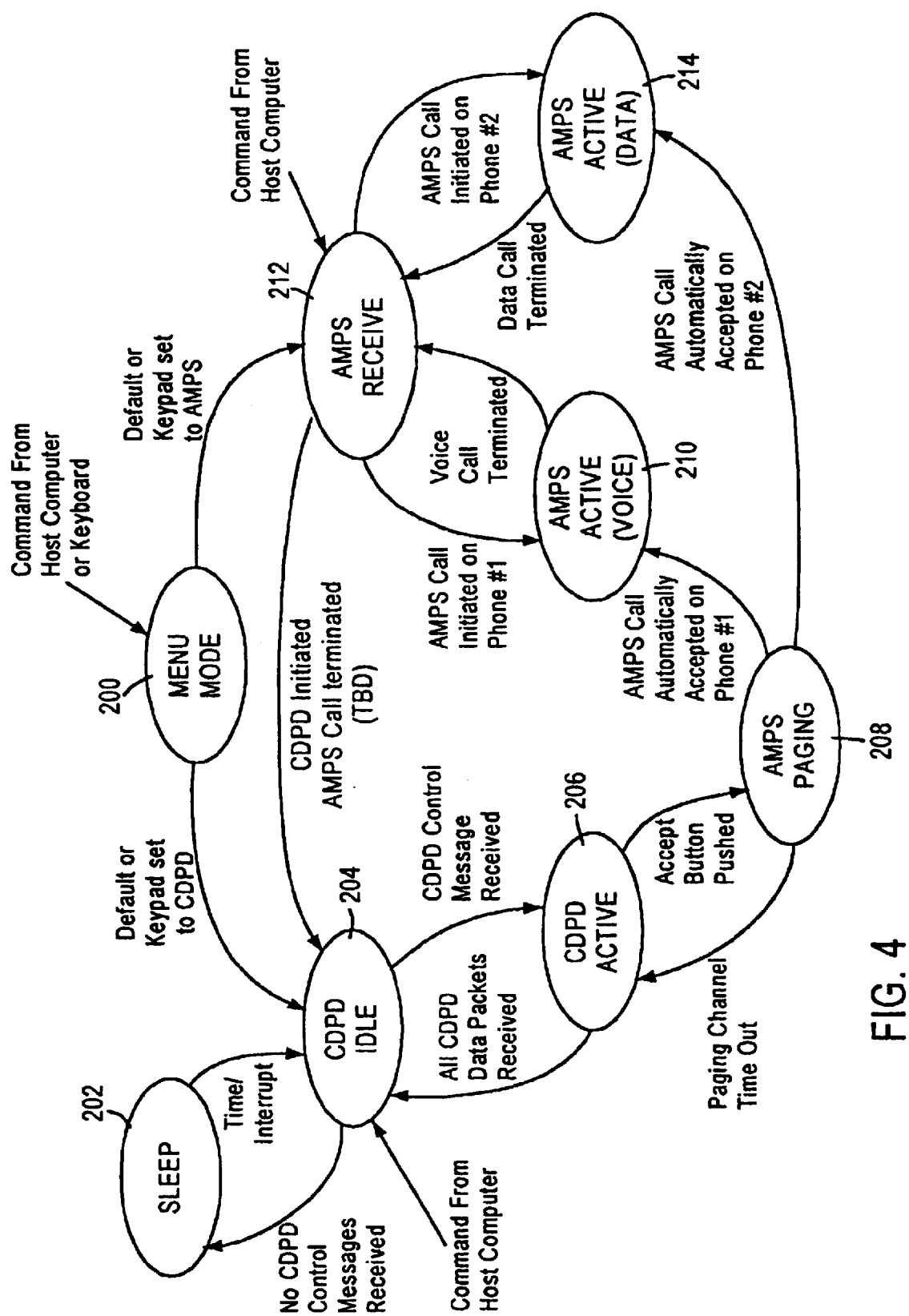
FIG. 4 is a representation of the operating modes available to the terminal supporting the present invention when used in an appropriate CDPD communication system.

To practice the present inventive method, the portable data terminal handset and subscriber station as depicted in FIG. 3 should be configured to permit all the modes of operation illustrated in FIG. 4. The circle designated as 200 in FIG. 4 represents the menu mode selection. This selection can be entered either by the operator or programmer of the portable data terminal 100. Either of the two modes (AMPS or CDPD) can be selected by an operator using a key pad or other input of the terminal 100. If data is being entered into the portable terminal 100 by a host computer, either the mode or the predetermined default setting can be selected as part of the data transfer.

For best results, the illustrated system is normally operated in a low-power "sleep" mode as indicated at circle 202. This "sleep" or dormant mode requires the least amount of power expenditure of the terminal 100. In typical CDPD operation, the sleep mode is interrupted every 10–255 seconds to allow the subscriber station to check for messages such as incoming paging signals. If no incoming paging signals are received, the CDPD mode remains idle as indicated at 204. The CDPD can be rendered active as indicated at 206 by the receipt of a paging signal, a command from the host computer or the handset user to initiate data transfer in the CDPD mode. The advantage of the subscriber station remaining in the CDPD mode is that the battery is not heavily burdened so that, based on current battery technology, talk time at full transmission power is greater than 1 hour and standby time while monitoring the AMPS control channel is greater than 12 hours.

The sleep mode is defined in the CDPD specification as an optional mode of operation that can be requested by a subscriber station M-ES during the data link establishment procedure (communication between the mobile end station and mobile data intermediate system). The sleep mode is typically used to facilitate power conservation strategies in an M-ES. The sleep mode is typically used to allow an M-ES to disable or power-down its receiver and associated circuitry.

The sleep mode procedure operates in what is known as a "multiple frame established state". If no frames are exchanged on the data link connection between a particular subscriber station M-ES and the MDBS after a period of time defined by a parameter "T203", the data link connection may be placed in a Temporary Equipment Identifier (TEI) sleep state of the handset. While in this TEI sleep state, the overall network will not attempt to transmit information destined for that M-ES. If, after entering the sleep state, new frames become extant and await initial transmission, the network will broadcast a predetermined message at periodic intervals. This message contains a list of TEI's for which channel data is pending. The M-ES's are expected to "wake up" at periodic intervals to determine if data for them is pending, and notify the network that they are willing to receive the pending data. Normally, the M-ES may exit the sleep state at any time.

Parameter "T203" represents the maximum time allowed without frames being exchanged on the data link connection before the M-ES is expected to enter the CDPD sleep mode. On the user/subscriber (M-ES) side, timing of the parameter T203 is started or restarted upon transmission of a data link layer frame of any type on the reverse channel (from the M-ES to the MDBS). On the network side, the timing of parameter T203 for a particular M-ES is started or restarted upon receipt of a data link layer frame (of any type) on the CDPD channel. If the value of parameter T203 expires, the data link entity will enter the TEI sleep state, and issue an indication of this state from the user's side. The layer management entity may take power conserving measures, such as disabling the subscriber radio receiver or other non-essential portions of its circuitry.

A second parameter, "T204", represents the time intervals at which the network side broadcasts TEI notification of pending data for a sleeping M-ES. A single timing operation for parameter T204 is maintained for a channel stream; all user side management entities discover and synchronize to particular channel streams T204, via the TEI notification procedure described in Section 6.8.8 of Part 403 of the CDPD specification. The number of frames queued in the maximum time for which the network attempts to notify an M-ES in the TEI sleep state is implementation dependent. The network releases a data link connection and discards all queued frames for which the TEI sleep notification procedures are aborted. The maximum number of attempts to notify an M-ES in the TEI sleep state of pending network transmissions is designated system parameter "N204". The network normally aborts a TEI sleep notification procedure for a TEI which has been included in a number expressed as parameter N204 of successive TEI notification messages without a response from that M-ES. Consequently, the subject M-ES will be de-registered from the CDPD system.

A complete description of the aforementioned operation is found in Section 6.8 of Part 403 of the CDPD specification, incorporated herein by reference as background material. The parallel operation of the M-ES and the MD-IS is depicted in the parallel flow charts of FIG. 5. Both the M-ES and the MD-IS recognize when the last CDPD communication by a particular subscriber at an M-ES took place. In this respect, both the M-ES and the ND-IS can be synchronized to each other. Using internal clocks, both units keep track of the time elapsed since the most recent CDPD communication between the M-ES and the MD-IS, as indicated at step 702 (a,b). Thus, in operation according to this part of the CDPD specification, if no data is sent in either direction over the air link for a certain length of time (parameter T203), the M-ES will go into the sleep mode and the network will assume that the M-ES is asleep, as indicated at step 703 (a,b). Once the M-ES enters the sleep mode another timing operation is carried out in both the M-ES and the MD-IS.

The total length of this period is defined by the product of the parameters T204 and N204 (T204*N204). If the network has data to deliver to a selected M-ES that is assumed to be asleep, the network will add the TEI for that M-ES to a list of sleeping units on a particular channel stream that have data waiting for them. However, the network will not send the data to the M-ES (step 704(b)). For each time frame measured by the parameter T204, the network will send a TEI indication for a particular subscriber unit M-ES indicating that there is data waiting for that subscriber station. Thus, the M-ES must monitor the CDPD channel at some time during the time frame (defined by T204) in order to determine if a message is waiting for that M-ES.

The list of M-ESs having pending messages is broadcast to all units on a channel stream periodically in a TEI notification message. The time between such a notification is specified by the T204 parameter. This parameter determines the length of time the M-ES is expected to sleep before "waking" for its pending messages. When the M-ES awakens, it waits until it receives a notification message. If the TEI of a selected M-ES is on the list, it notifies the network that it is ready to receive its data. If the TEI of a selected M-ES is not on the list, the selected M-ES goes back to sleep for another period of time, normally for a duration specified by the parameter T204. If a consecutive number of notifications (specified by the parameter N204) have been made for a TEI without the selected M-ES indicating that it is ready to receive data, the network will assume that the M-ES is no longer present on the CDPD system. The network will discard the data that was pending for the selected M-ES, as indicated at step 705(b). If the selected M-ES is processing normal AMPS communication for longer than the duration specified by the product of parameters N204 and T204, the data that is held for the selected M-ES is discarded by the CDPD network. Thus, CDPD communications can be lost due to normal operation of the M-ES in an AMPS system.

Because the AMPS mode of operation is given priority over the CDPD mode of operation, the terminal 100 preferably spends most of its time monitoring for AMPS communication. The terminal 100 preferably spends enough time in the CDPD mode to determine whether it has pending messages before being de-registered from the CDPD system. Consequently, one preferred method of operating an M-ES in accordance with the present invention is to remain in the AMPS mode monitoring an AMPS control channel while periodically breaking away from the AMPS system to poll the CDPD network. When breaking away from the AMPS system, the M-ES preferably sends a polling signal to the CDPD network to evoke a response and determine if there is any data waiting on the CDPD network for transmission to the M-ES. After listening on the CDPD network for an appropriate amount of time (typically defined by parameter T203) for a return message, the M-ES switches modes and tunes back to the AMPS channel. The return to AMPS operation preferably occurs before re-transmission of any relevant AMPS pages that might have been missed while the M-ES was last operated in the CDPD mode.

As described above, the time period that the M-ES must wait after sending the polling signal is defined by the parameter T203. This is the time period that the CDPD network has to respond to the polling signal from the M-ES to indicate that data is waiting for that M-ES. If the M-ES misses the waiting data (i.e., by returning to the sleep mode), the M-ES may be de-registered from the CDPD network.

Once the M-ES has completed communicating using the CDPD system, it may appear to go into the sleep mode once again and the CDPD network may interpret the M-ES as being asleep. This is true even if the M-ES functions once again in the AMPS mode. In this sense the M-ES is said to "fool" the CDPD system that it is asleep when in fact it is monitoring for AMPS messages. In this mode, different values are appropriate for the T203, T204 and N204 parameters than those values which are appropriate when the M-ES actually enters a sleep mode and uses the sleep mode for its intended power conservation purpose.

The aforementioned operation performs better if the value of the parameter T203 is smaller than that used for the actual CDPD sleep mode. With lower T203 values, it does not take very long for the network to determine that the M-ES is operating in a sleep mode. This is necessary to facilitate a quick response to incoming AMPS communications. The lower the value T203 is, the faster the CDPD network assumes that the M-ES is asleep. This allows the M-ES to more quickly respond to AMPS communications.

Adjustment of T203 to accommodate the operation of an M-ES is particularly important given that it is common for many AMPS systems to repeat communication pages on the control channel once every 4–10 seconds. Consequently, it is advantageous to use an M-ES which can accept the parameter T203. This allows the M-ES to change modes and check the AMPS control channels in synchronization with the AMPS pages.

When parameter T203 is large, the M-ES takes more time to switch modes to monitor the AMPS control channels. Thus, there is the possibility that an indication of incoming CDPD communications for a selected M-ES will be lost during the time that the M-ES receives the AMPS communication. There is also the possibility that an AMPS page may be missed when the M-ES changes modes from AMPS to CDPD to scan for CDPD messages. Optimum operation requires that the T203 value be related to the operation of the AMPS paging system.

In the conventional operation of the CDPD system, the M-ES cannot unilaterally control the value of its own parameter T203. Rather, the M-ES must request a value for T203 from the CDPD system. In the present system, the value cannot be less than ten seconds. Also, the parameters T204 and N204 are not normally controlled by the M-ES in a CDPD network. Rather, control of these parameters resides within the CDPD network, and, more specifically, within the MD-IS to which a selected M-ES is currently assigned. Consequently, it is very difficult to coordinate the timing of the ME-S so as to effectively monitor an AMPS control channel for a predominant amount of time while switching back to the CDPD channel only to receive critical paging messages. The necessary coordination of M-ES operation to the AMPS paging cycle (repeated every 4–10 seconds) while still adhering to the requirements of the CDPD paging cycle is quite difficult.

The present invention uses certain parameters (e.g., T203) to make the CDPD network "believe" that the M-ES is asleep, during which time the M-ES enters the AMPS mode (including tuning its radio to another channel, if necessary) and performs AMPS functions. These parameter adjustments are made by the M-ES. After the AMPS scanning functions are complete, the M-ES re-enters the CDPD mode and notifies the CDPD network that it is ready to receive any data that is pending for the M-ES (by virtue of the TEI of that M-ES being on the list of sleeping stations).

Figures 5A, 5B:
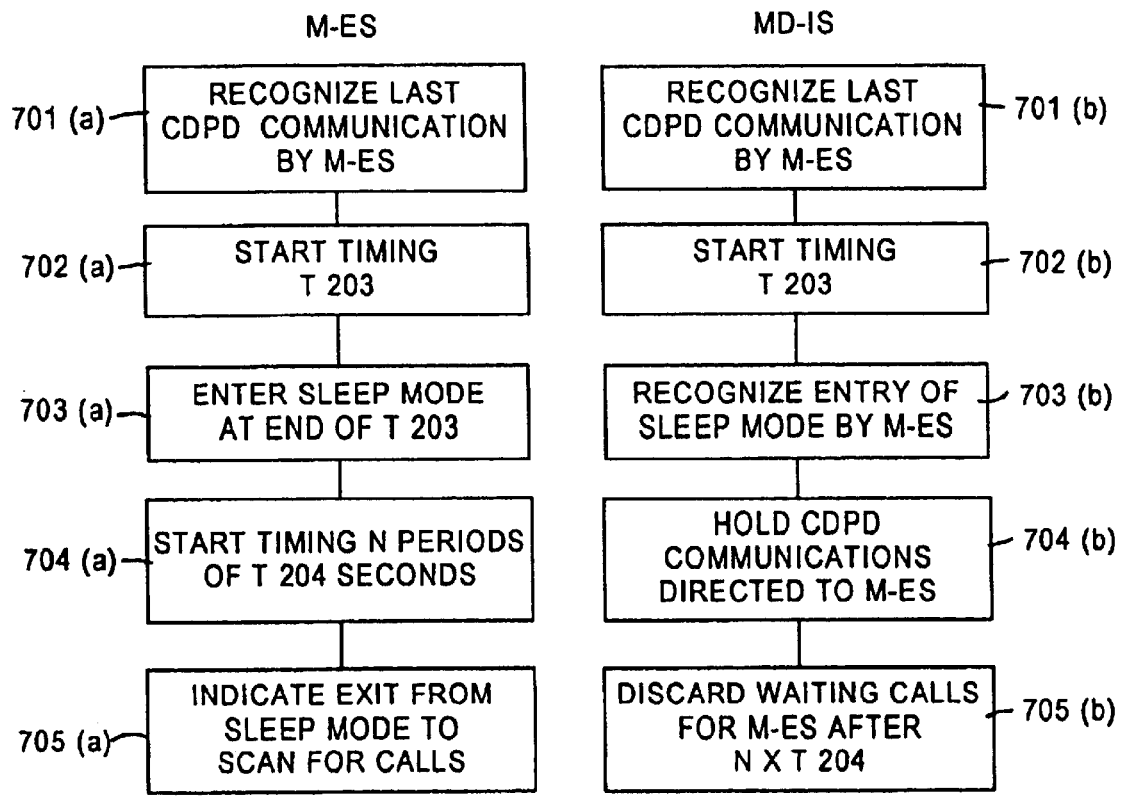
FIG. 5 is a flow chart depicting analogous operation for the terminal and the Mobile Data Intermediate System (MD-IS) used to carry out the present invention.

Referring again to the flow chart depicted in FIG. 5, the M-ES appears to enter the sleep mode at step 703(a). However, rather than remaining in an actual CDPD sleep mode, the M-ES switches modes and tunes to an AMPS control channel to monitor AMPS activity. The CDPD network, however, continues to assume that the M-ES is asleep. The frequency that the M-ES checks for AMPS activity is related to the frequency that the AMPS system sends paging messages indicative of AMPS communication.

The parameter T204 can be adjusted to facilitate the most advantageous coordination between the CDPD and AMPS paging cycles. However, in order to carry out this coordination, the M-ES must synchronize its timing with the T204 and the T203 parameters.

The adjustment of the T203, T204 and N204 parameters by the M-ES is especially helpful in reducing the amount of time spent monitoring a CDPD channel. This adjustment also can be used to increase the amount of time spent monitoring an AMPS control channel. However, allowing these parameters to be adjusted by each M-ES results in substantial control and coordination problems. Control of these parameters by the M-ES on a practical basis would most likely be limited to control of the T203 parameter due to the limitations of the M-ESs and the complexity of multiple T204 and N204 values throughout an area controlled by any MD-IS.

Control and coordination of these parameters can be provided by the M-ES, either manually or automatically. Automatic control can be provided in response to the amount of AMPS usage by a particular M-ES. Thus, the MD-IS does not need to configure its operation based upon generalized statistical analysis of AMPS versus CDPD usage of all user stations associated with an MD-IS serving the selected M-ES. Rather, parameter selection should be the responsibility of each M-ES. These parameters can be sent in any known manner convenient to the normal exchange of data between a mobile station and a base station.

However, the use of different values of T204 by each M-ES could cause an undue control burden for the MD-IS controlling a CDPD system, or section thereof. While such control problems can be overcome by substantial hardware and software additions to the MD-IS controlling the CDPD system, such modifications are not within the scope of the present invention. Nor is such operation within the realm of the current CDPD administrative control equipment.

In accordance with Version 1.1 of the CDPD specification, the parameter T203 is set by the MD-IS after the M-ES requests it. If no request is made by the M-ES, the CDPD system sets T203 to a default value of 30 seconds. In accordance with the present invention, to facilitate coordination with AMPS communication systems, the M-ES preferably requests that the value of T203 be set as low as possible. Presently, the minimum value allowed by the CDPD system is 10 seconds. However, even the minimum value is too long to easily coordinate with the paging cycle of most AMPS communication systems. A lower value for T203 can be selected by an M-ES. However, the minimum value that may be set for T203 is 0 seconds (which indicates the absence of a CDPD sleep mode). This is impractical for an M-ES that is attempting to monitor both AMPS and CDPD paging signals at the same time.

The parameter T204 is established by the CDPD network and may not be varied by individual M-ESs. A value between 20 and 250 seconds is common. Typically, this parameter is set to approximately 1 minute. In the current CDPD administrative environment, M-ESs do not make request variations to the T204 parameter. The T204 parameter is important to the operation of the present invention because each M-ES must be synchronized to the T204 timing by the MD-IS controlling that part of the CDPD system. While the CDPD specification does not require that the same synchronization be used for all cells controlled by a particular MD-IS, it is reasonable to expect that this will be done in most cases in order to avoid de-synchronization with the TEI cycle (defined by the T204 parameter) when an M-ES changes cells. This is critical since re-synchronization of the TEI cycle of the CDPD system can take between 30 and 300 seconds. During this time, a high risk of losing incoming AMPS communications would exist.

De-registration (requiring between 30 and 300 seconds) or de-synchronization with the T204 timing occurs only when data is waiting for a selected M-ES and the selected ME-S does not answer pages for at least a time period greater than that defined by the product of the parameter N204 and the parameter T204 (N204*T204). The parameter N204 may not be adjusted per se by the M-ES. However, M-ESs can request that the CDPD network modify the value of N204. Parameter N204 is normally set at a value of five. However, values of four and six are also common.

In a typical communications environment, an M-ES registers with a CDPD system and requests a T203 parameter of 10 seconds during the exchange of TEI messages and synchronization with the TEI timing (as well with the T203 timing). This process is described as the data link parameter exchange in Version 11.1 of the CDPD specification, Part 403, page 53, Table 403-8.

In the typical AMPS environment which is associated with the CDPD environment, AMPS paging signals are sent every 4–10 seconds. A conflict between scanning for AMPS paging signals and scanning for CDPD indications results due to the aforementioned paging cycles for each. This is especially critical for the initial T203 time duration because an M-ES will be de-registered from the CDPD system if it does not respond to an existing CDPD page during that time period. However, if the M-ES remains registered on the CDPD channel during the entire duration of the T203 time period, the M-ES is also liable to miss an incoming AMPS paging signal.

In order to reduce the risk of missing an AMPS communication, the present invention switches modes to the AMPS control channel during the time period designated by T203 (after a response to the polling RR signal sent by the M-ES). The purpose of this switch from the CDPD mode to the AMPS mode is to prevent the M-ES from remaining away from the AMPS control channel for a total of greater than approximately 3–5 seconds and thereby allow the M-ES to avoid missing a re-transmission of an AMPS paging signal.

Cell transfers present a potential problem with regard to missed communications. Assuming that a cell transfer has just been completed and that the CDPD network takes approximately 3 seconds to respond to a polling message sent by an M-ES which has just completed the cell transfer, an effective window of approximately 5 seconds exists for the M-ES to change modes and monitor an AMPS control channel. During the 5–10 seconds that the M-ES is tuned to an AMPS control channel, CDPD de-registration can occur. However, the risk of de-registration is sufficiently small to make this approach practical.

After switching to the CDPD channel for the maximum time period possible without missing incoming AMPS paging messages, the M-ES switches back to the AMPS control channel (if no incoming data has been detected by the M-ES on the CDPD channel after approximately 3 seconds). At this point, T204 timing becomes critical since de-registration and de-synchronization can occur if the M-ES fails to detect a TEI notification message "N" times in a row (where N is the N204 parameter). De-registration and de-synchronization should be avoided because the registration and re-synchronization process can take between 30 and 300 seconds. However, registration and re-synchronization typically takes between 30 to 90 seconds. In both cases, the chance of losing incoming AMPS communication exists while re-synchronization is being processed. De-synchronization and de-registration will not take place if no data is being held for a selected M-ES even if the selected M-ES has not monitored the CDPD channel for "N" TEI notification periods. Normally, the M-ES could switch back from the AMPS channel to the CDPD channel 2 seconds or so before the end of the T204 time period to wait for the TEI notification message. If there is no indication of data for the M-ES within approximately 5 seconds, the M-ES will switch back to the AMPS control channel.

As described above, one of the unique aspects of the present invention is the capability of monitoring activity in a first cellular communication system while concurrently monitoring activity in a second cellular communication system. In the example given, the first communication system is the well-known CDPD system and the second communication system is the well-known AMPS system. However, it should be noted that the present inventive method is not restricted to operating within these systems. Rather, the present invention may also be used to monitor activity in any first analog communication system while concurrently monitoring activity in any second digital system which is designed to overlay the analog system. Only minor modifications need to be made to the present inventive method in order to facilitate concurrent monitoring of differing analog and digital systems.

Figure 6:
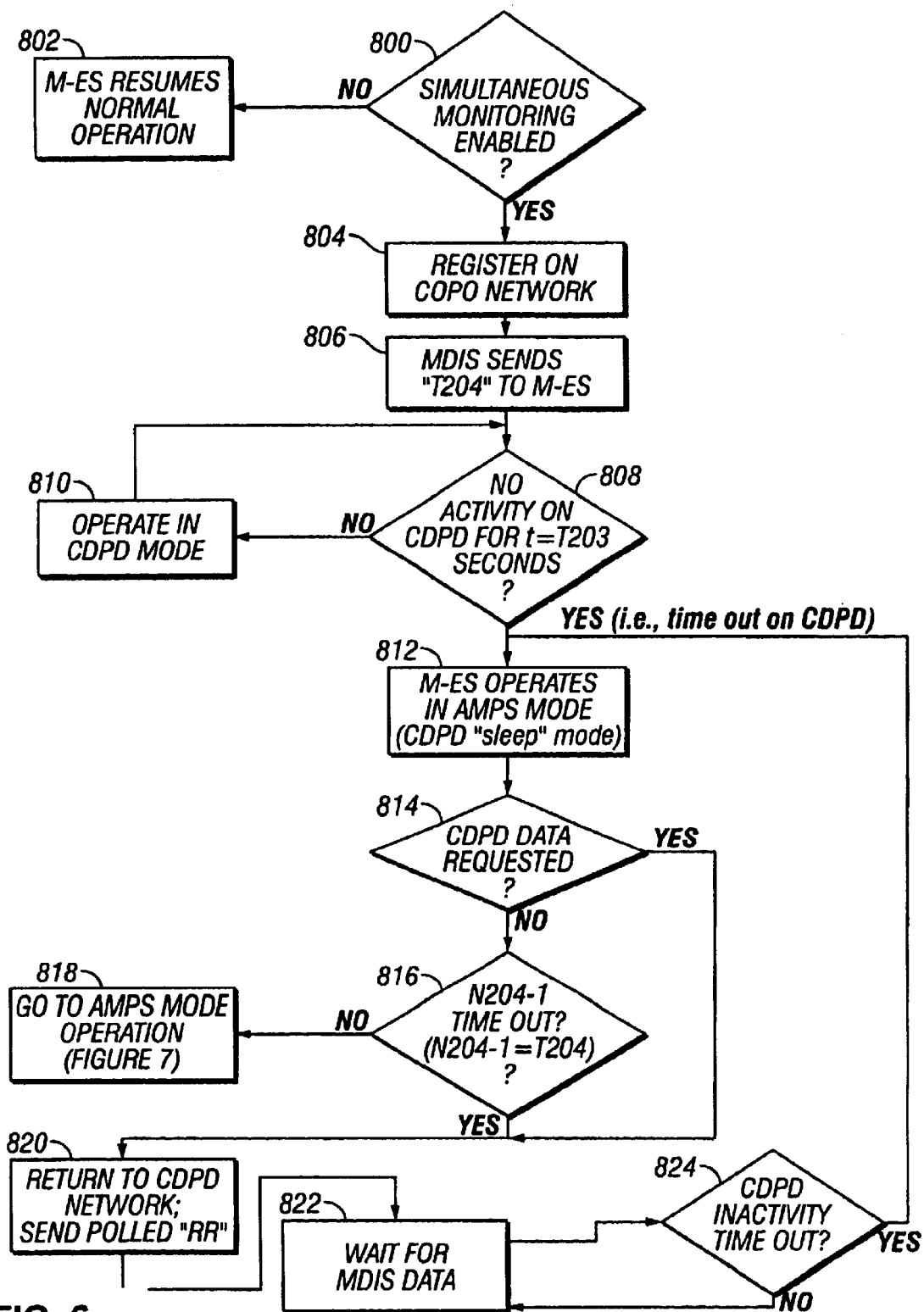
FIG. 6 is a flow diagram depicting the steps required of a wireless subscriber station when concurrently monitoring the communications activities in both the CDPD and AMPS communication systems.
Figure 7:
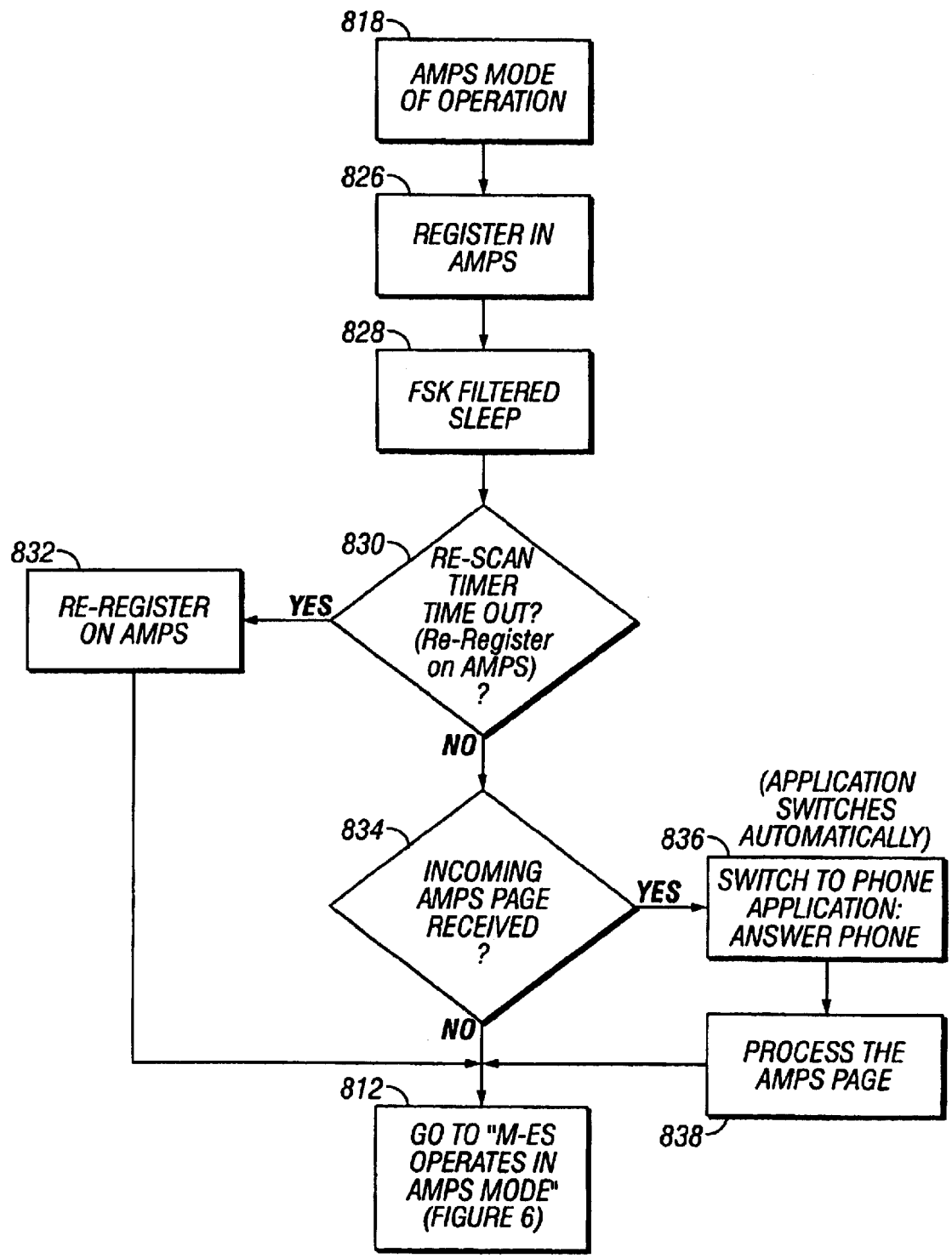
FIG. 7 is a flow diagram depicting the steps required of a wireless subscriber station when operating the station in an AMPS mode while concurrently maintaining the station in a CDPD sleep mode.

FIGS. 6 and 7 are flow diagrams which depict the steps required to concurrently monitor activities in both a CDPD communication system and an AMPS communication system. An M-ES made in accordance with the present invention must execute the steps set forth in FIGS. 6 and 7. For example, the control processor 109 of the exemplary subscriber unit shown in FIG. 3 typically would be used to execute software implementing the steps set forth in FIGS. 6 and 7.

As shown in FIG. 6, a decision is made at step 800 to determine whether the simultaneous monitoring mode is enabled in the M-ES. If the simultaneous monitoring mode is not enabled, the M-ES resumes normal operation as indicated at step 802. However, if the simultaneous monitoring mode is enabled, the M-ES initially registers with the CDPD network as described above at step 804. CDPD registration is described in more detail hereinabove and in the CDPD specification. The M-ES remains active on the CDPD network until the unit is allowed to sleep. Before the ME-S can enter a CDPD sleep mode it must process a TEI_NOTIFICATION message which specifies the T204 value. As indicated at step 806, the MDIS sends the value of T204 to the M-ES. As described above, T204 specifies the time intervals that the CDPD network broadcasts TEI notification of pending data for a sleeping M-ES. In other words, T204 specifies the amount of time the M-ES can remain in the CDPD sleep mode. The M-ES will go to sleep if there is no activity on the CDPD network for a duration of T203 seconds. Therefore, at step 808 the M-ES checks its T203 timer (typically set to approximately 10 seconds) to determine whether there has been any activity on the CDPD network. If activity has occurred on the CDPD network, or the T203 timer has not timed-out, the M-ES continues to operate in the CDPD mode at step 810. The CDPD activity timer is checked again at state 808.

However, once there has been no activity on the CDPD network for a duration equal to or greater than that specified by the T203 parameter, the M-ES enters the CDPD sleep mode of operation. In accordance with the present inventive method, the M-ES, in fact, does not go to sleep as indicated at step 812. As described above and as shown at step 812 of FIG. 6, instead of going to sleep, the M-ES switches operation to an AMPS mode in order to check activity and receive pages in the AMPS system. The M-ES will remain active in the AMPS mode until either there is CDPD traffic requiring delivery or the M-ES' CDPD sleep time expires (as specified by the product of N204*T204). These two determinations are made at steps 814 and 816, respectively.

The M-ES determines whether CDPD data is requested at step 814. CDPD traffic is typically requested by a user when the user manually activates an input device (e.g., by depressing keys on the M-ES user interface or keypad). If no data is requested at step 814, at step 816 the M-ES determines whether the duration defined by the product of N204 and T204 has expired. That is, the M-ES determines whether it needs to return to the CDPD network before the network de-registers it. If the duration defined by (N204*T204) has not expired, the M-ES continues to operate in an AMPS mode as indicated at step 818. The AMPS mode of operation (beginning at step 818) is described in more detail hereinbelow with reference to FIG. 7. However, once the duration defined by the product of N204 and T204 expires, the M-ES must return to the CDPD network before being de-registered. This occurs at step 820.

When the M-ES returns to the CDPD network in step 820, it sends a "polled receiver ready (RR)" signal to the CDPD system as described above. At step 822, the M-ES then waits to receive data from the MDIS associated therewith, assuming that the MDIS has buffered data for the selected M-ES. If the MDIS has data for the selected M-ES, it is processed in a known manner at step 822. The M-ES will continue to wait for data until its CDPD inactivity timer expires. Once the M-ES' CDPD inactivity timer expires, it will return to the AMPS network. CDPD inactivity is checked at step 824. As described above, if there is no activity with the M-ES in the CDPD network for an interval greater than or equal to the interval defined by T203, the M-ES enters the CDPD sleep mode and switches to an AMPS mode of operation at step 812. Else, the M-ES waits for CDPD data at step 822.

Typically, the M-ES will request that its inactivity timer be set to 10 seconds for concurrent monitoring. Some CDPD networks will not support a 10 second value for T203. In these cases, the M-ES will inform the network that the CDPD inactivity timer is some other value (e.g., 20 seconds), however, the M-ES will, in fact, use a 10 second (or less) inactivity timer. As a result, the M-ES will remain on the CDPD network for no greater than 10 seconds. The M-ES will rely upon its associated MDIS to place the M-ES on its TEI notification list when the MDIS recognizes the M-ES as sleeping.

FIG. 7 shows a flow diagram for operating the M-ES in an AMPS mode while concurrently maintaining the M-ES in a CDPD sleep mode. The step 818 shown in FIG. 7 is identical to the step 818 of FIG. 6. As described above with reference to FIG. 6, once the M-ES determines that the duration defined by the product (N204*T204) has not expired (i.e., the time that the M-ES can remain in a CDPD "sleep" mode without being de-registered from the CDPD system has not expired), the M-ES continues to operate in an AMPS mode as indicated at step 818. As shown in FIG. 7, the M-ES must register in the AMPS system in known manner at step 826. The M-ES then enters an FSK filtered sleep state at step 828. The M-ES then must determine whether its "re-scan" and re-registration timer has timed-out at step 830. If the registration timer expires, the M-ES must re-register on the AMPS system as shown at step 832. If the re-scan timer expires the M-ES re-scans the AMPS control channel in a known manner to find the next best control channel that is available. After re-registering on the AMPS system at step 832, the M-ES returns to the AMPS mode of operation at step 812 (FIG. 6) and continues in accordance to the flow diagram of FIG. 6.

However, if the re-scan timer has not expired, the M-ES continues operation at step 834 to determine whether it has received an incoming AMPS page. If it has not, the M-ES returns to the AMPS mode of operation at step 812 and continues in accordance to the flow diagram of FIG. 6. However, if an AMPS page is received by the ME-S, the M-ES preferably automatically switches control to an AMPS phone application program and answers the phone as shown at step 836. The M-ES then processes the AMPS page in a known manner at step 838. An exemplary AMPS phone application program is described below with reference to FIGS. 8 and 9.

Figure 8:
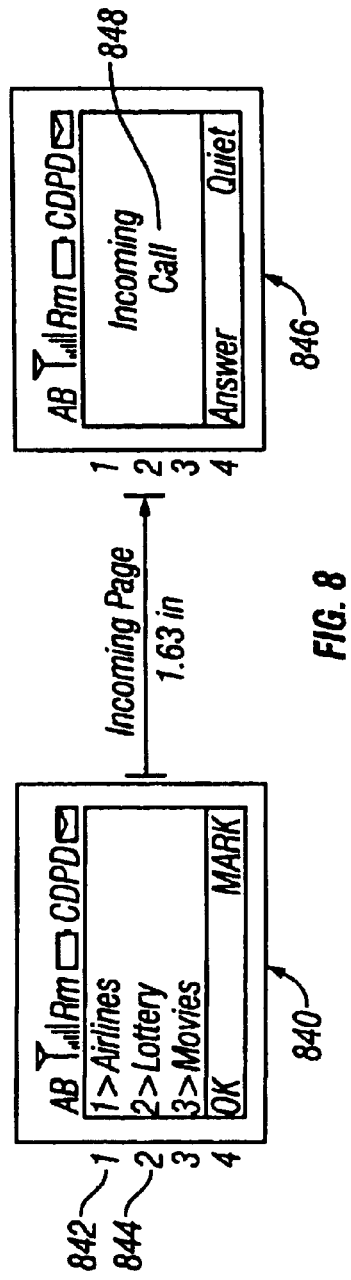
FIG. 8 shows exemplary subscriber unit displays which are updated in accordance with the present invention's facility for automatically switching from a CDPD M-ES application to an AMPS phone application when the subscriber unit detects an incoming AMPS page.
Figure 9:
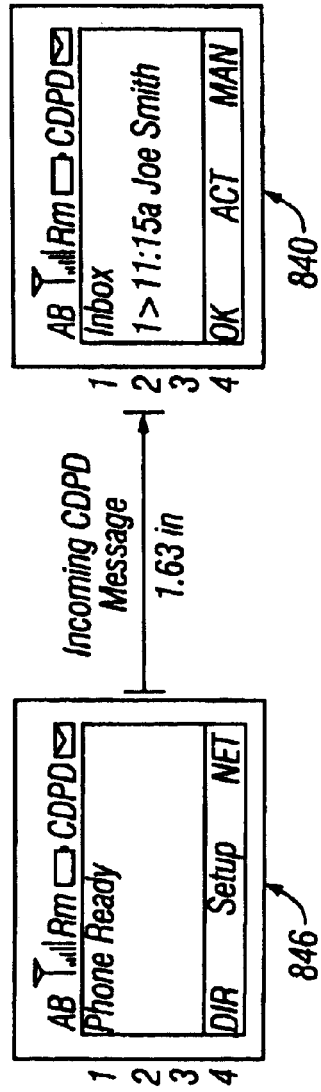
FIG. 9 shows exemplary subscriber unit displays which are updated in accordance with the present invention's facility for automatically switching from an AMPS phone application to a CDPD M-ES application when the subscriber unit detects an incoming CDPD message.

Preferably, when the M-ES runs a CDPD application program, and an AMPS page is detected by the M-ES, the M-ES immediately displays an "answer menu" on the M-ES display. Similarly, when the M-ES runs an AMPS phone application program, and CDPD traffic is detected or requested by the M-ES, the M-ES preferably immediately displays the CDPD application to the user. Thus, the M-ES is said to "automatically", i.e, without user interaction, switch application programs and user displays depending upon whether an AMPS or a CDPD page is received. Exemplary application displays are shown in FIGS. 8 and 9.

In one embodiment of the present invention, at least two application programs should be executed by the subscriber station. In the examples shown in FIGS. 8 and 9, one application is an AMPS cellular phone while the other is a CDPD mobile end system. The application programs typically are made manifest to the user via a display which is integral to the subscriber station. The AMPS phone application preferably manages incoming AMPS pages, outgoing voice calls, directory management functions, and other miscellaneous phone setup functions. The CDPD mobile end system applications can vary depending upon the CDPD network with which the subscriber station communicates. However, generally the CDPD mobile end system application controls the transmission and reception of data via the CDPD network.

As described above with reference to FIG. 6, when the concurrent monitoring mode is disabled the subscriber station resumes "normal" operation (see step 802). During normal operation the subscriber station can switch between applications only under user control. This typically occurs when the user presses a keypad on the subscriber station which indicates either AMPS or CDPD operation. However, other means of user control are presently contemplated such as voice recognition and activation.

In contrast, when concurrent monitoring is enabled (step 804 of FIG. 6), applications automatically switch depending upon the activity on the network. For example, as shown in FIGS. 8 and 9, a CDPD application is shown to be active. A typical CDPD application display is shown generally at 840. As indicated on the display, the user can access CDPD data such as airlines, lottery, and movie information. As shown in FIG. 8, a user can request to receive "airlines" information over the CDPD network by selecting category "1" 842 from the menu shown in the CDPD application. Similarly, the user can request to receive "lottery" information over the CDPD network by selecting category "2" 844 from the menu. However, as shown in FIG. 8, the application (and thus the user display) changes automatically when activity is detected on the AMPS network. For example, the application switches automatically from the CDPD M-ES application (840) to the AMPS phone application (846) when the subscriber station detects an incoming AMPS page. The M-ES detects the incoming page as described above with reference to FIG. 7 at steps 832 and 834. As shown in FIG. 8, an incoming call is indicated by an appropriate message 848 in the AMPS phone application display.

Similarly, as shown in FIG. 9, the application and the user displays change automatically when activity is detected or data is requested using the CDPD network. For example, the display switches automatically from the AMPS phone application 846 to the CDPD M-ES application 840 when the user requests receipt of an incoming CDPD message. The user requests receipt of a CDPD message as described above with reference to FIG. 6 at step 814. The advantage of the M-ES displays shown in FIGS. 8 and 9 is that no user interaction is required to switch between the two communication systems. In this manner, the subscriber station is able to provide true seamless, transparent dual functions to the user.

Unfortunately, there is no way to be certain that the TEI notification messages will be exactly T204 seconds apart because the messages can be buffered in the MDBS before other data awaiting transmission. The operation of this embodiment of the present invention is predicated on the assumption that the TEI notification will not often be delayed more than 2 seconds from the time they are supposed to be transmitted Such a limitation will aid in facilitating the MD-IS MDLP re-transmission timers which operate on the order of 5 seconds. Consequently, this limitation is viable in the operation of the CDPD system.

A special situation exists if a cell has more than one active CDPD channel stream. This is normally not the case. However, as demand for CDPD use grows, the situation will soon become a factor in the operation of any CDPD system, and will create a whole new set of problems. This is not a factor when a directed hop is performed by the ME-S because the M-ES is told precisely where to tune for the CDPD channel stream with which the M-ES is associated. However, when an undirected hop occurs, it is necessary for the M-ES to scan the active channels to locate the CDPD channel. Acquisition of the TEI notification message by the M-ES is not a problem since synchronization with the T204 parameter already occurred when the M-ES registered with the CDPD system. However, the TEI notification message is not necessarily in synchronization with the transmission of the channel stream identification number. This number is needed by the M-ES to determine if the correct channel stream has been located.

If there is no immediate data message for a particular M-ES upon receiving the TEI, the M-ES can wait on the CDPD channel for the channel stream identification message, or it can switch modes to an AMPS channel to determine whether an AMPS page has been missed. Normally, the channel stream identification message is sent once every 5 seconds while a typical AMPS page is sent once every 4–10 seconds. Consequently, it may be necessary for the M-ES to switch operation from the AMPS channel back to the CDPD channel several times to receive at least one channel stream identification message.

Once such a message is received, the M-ES ascertains whether that channel stream is already associated with the M-ES. If not, the M-ES sends a polled receiver/ready (RR) signal to the CDPD system which indicates that the M-ES has switched channel streams. If the CDPD system has buffered (usually for approximately 2 seconds) any incoming CDPD messages for that M-ES on the other channel stream, the buffered messages are transferred to the new channel stream and sent to the M-ES within the time period defined by the parameter T203.

Once again, the M-ES is confronted with the problem of remaining on the CDPD channel for the entire T203 duration, or switching back to the AMPS control channel to monitor for incoming AMPS pages. Because synchronization exists with the T203 parameter, the M-ES has the option of switching to the AMPS channel and returning to the CDPD channel before the end of the T203 time period to receive incoming CDPD data messages. By performing this switching operation the M-ES runs a small risk of being de-registered from the CDPD system if any incoming data messages are missed during the time that the M-ES is monitoring the AMPS control channel. The risk is generally considered small enough to justify maintaining an optimal AMPS operating efficiency.

If there are no data messages waiting for the M-ES during the T203 period, the absence of the M-ES from the CDPD channel will not be detected by the CDPD system (i.e., will not be detected by the MD-IS) and de-registration will not occur. For optimal performance, if the M-ES determines that it has changed channel streams within the same cell it should go back to the AMPS control channel for a minimum acceptable period before returning to the CDPD channel and completing a channel hop. Channel hops are completed by the M-ES which sends a polling RR message to the CDPD network.

Whenever a subscriber station determines that a cell transfer is required in accordance with the CDPD specification, the M-ES tunes back to the AMPS control channel for at least the interval between AMPS pages before returning to the CDPD channel and carrying out the cell transfer algorithm. If an M-ES is "sleeping" (or monitoring on an AMPS control channel), there is normally no decision to be made by the M-ES with respect to a hand-off. This is not a problem in the CDPD system because there is no reverse channel interference. According to the CDPD specification, sleeping mobile units do not execute an RSSI scan procedure until they are ready to transmit. The only requirement of a sleeping M-ES is that it not move so far away from a cell site that it cannot reliably receive TEI notification messages. This requirement can be assured by checking block error rate (BLER) criteria while tuning to the CDPD channel to check for TEI notifications.

When an M-ES completes a cell transfer it sends a polling message to the CDPD network to indicate that the M-ES has changed channels. This polling message also indicates to the CDPD network that the M-ES is "awake". Consequently, the M-ES must remain "awake" on the CDPD control channel for at least T203 seconds after the M-ES receives the CDPD network response to a polling message. Otherwise, if the serving MD-IS has data to deliver to the M-ES before the M-ES is expected to return to the sleep mode, the MD-IS will attempt to deliver the waiting data immediately. If the MD-IS fails to deliver the waiting data to the M-ES (i.e., because the M-ES is no longer on the CDPD control channel), the M-ES will be de-registered from the CDPD system. Thus, there is a strong motivation for the M-ES to remain on the CDPD control channel for a minimum of 10 seconds as defined by the T203 parameter. This is especially true when more than one CDPD channel stream exists for the new cell.

However, as described above, the time that the M-ES spends exclusively operating on the CDPD control channel clearly places the M-ES at risk of losing incoming AMPS calls, especially in an environment where cell transfers (which require that the aforementioned process be carried out) are relatively frequent. Therefore, the M-ES does not attempt to stay on the CDPD channel for 10 seconds (the T203 value). Rather, the M-ES stays on the CDPD channel as long as it reasonably can before returning to the AMPS control channel to scan for AMPS paging signals directed to the M-ES. Consequently, the M-ES reduces the risk of being de-registered from the CDPD network.

To reserve the maximum amount of time for determining if data will be delivered to the M-ES upon completion of a cell transfer, cell transfers should be executed as quickly as possible. It is therefore necessary to keep the cell transfer database up to date. Otherwise, the M-ES will fall back into the initial acquisition of this data due to insufficient adjacent cell information. This does not pose a problem with initial registration and synchronization because sufficient time is allowed for the cell transfer database of the RRME to be constructed. However, it does pose a problem when performing a cell transfer.

To solve this problem, in accordance with another aspect of the invention, upon cell transfer, the M-ES alternates between the AMPS and the CDPD control channels in a pattern that covers the entire RSSI scan interval as quickly as possible. In this manner, the M-ES rebuilds the cell transfer database from the cell configuration message which it scanned during the RSSI interval before the previous cell configuration data is deleted from the M-ES.

Normally, the RSSI scan interval is between 30 and 120 seconds. The scan interval must encompass the entire cell configuration message needed to provide the database for a cell transfer. This information includes an indication of the existence of more than one CDPD data channel stream in use for a particular cell. Because of the necessity of switching to the AMPS mode periodically to check for AMPS paging messages, it is not feasible for the M-ES to remain in the CDPD mode for the entire duration of the RSSI scan interval. Consequently, the M-ES must switch between CDPD and AMPS channels. Therefore, a plurality of RSSI scan periods are required in order to obtain all of the cell configuration data necessary for an effective cell transfer. Because this process may take several minutes, and because a moving M-ES may require frequent hand-offs, it is necessary to retain cell configuration data of the previous cell in order to provide some information when a hand-off is needed before the cell configuration data set for the present cell is obtained by the M-ES.

Another consideration is presented due to the M-ES's frequent switching between an AMPS and CDPD modes. A finite amount of time would typically be lost each time a mode switch takes place. The time needed to tune between the two channels, plus the time needed for a complete maximum size frame to be received by a M-ES, is indicated by the parameter "g". Typically, "g" is approximately 300 ms. As a result, the RSSI scan interval must be received by the M-ES on a staggered basis over a plurality of RSSI scan periods. This staggered M-ES scanning process is shown in FIG. 10.

Figure 10:
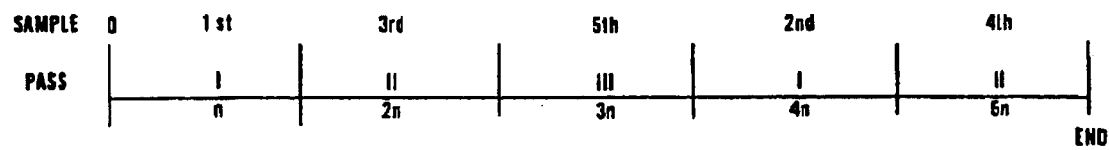
FIG. 10 is a time diagram depicting subscriber scanning during the RSSI interval.

As shown in FIG. 10, the parameter "n" is the minimum time between AMPS pages. The parameter "g" is the guard time necessary to allow for tuning between AMPS and CDPD modes. As long as the maximum time between AMPS pages is less than the quantity ($2n-g$), it will be possible to cover the entire RSSI scanning interval in three passes. Consequently, the RSSI scanner should be divided into even multiples of $2n$. Using as an example a value of 4.5 seconds for the parameter "n", "g" is 200 ms and the quantity $2n-g$ is 8.7 seconds. These are typical values, as is the representative 90 second duration for the RSSI interval used in FIG. 10.

In the first scanning slot (n) the M-ES monitors the CDPD channel to obtain the information depicted in that time slot. Afterwards, the M-ES switches to monitor the AMPS control channel for a period of time. After scanning the AMPS control channel the M-ES scans the CDPD channel during the $4n$ time slot and obtains the information regarding the cell configuration data contained therein. As the RSSI interval is repeated the M-ES takes a third pass in the time slot designated $2n$ before returning to the AMPS channel. After monitoring the AMPS channel, the M-ES returns to the CDPD channel during the time slot designated $5n$ to collect the data contained therein. After the RSSI interval has elapsed the second time, the M-ES remains on the AMPS control channel until the time interval $3n$, during which the M-ES collects the data contained therein. Because the RSSI scan interval is typically 90 seconds (a representative value which is typical in many CDPD systems), these three passes are necessary in order for the subscriber station to obtain the entire cell configuration message. Consequently, approximately 4 minutes are needed for the entire cell configuration message to be obtained by the M-ES.

Because the M-ES can be de-registered from the CDPD system due to extended AMPS usage, another feature of the present invention provides a process of periodically checking for CDPD registration. Representative time periods vary from 5 minutes to 1 hour. However, other time periods could be used as deemed appropriate based upon the activity in both the CDPD and AMPS systems. During the periodic CDPD registration check, the M-ES remains tuned to the CDPD control channel during the entire duration of the time period which is defined by the parameter T203. While this means that the M-ES risks losing an AMPS communication during the time frame defined by the T203 parameter, this is acceptable if conducted only once every 5–60 minutes. The risk is made more acceptable because if the M-ES is de-registered from the CDPD network, the re-registration process will present a much greater risk of losing incoming AMPS calls directed to the M-ES.

Alternatively, the M-ES can remain tuned to the CDPD channel as long as possible before returning to the AMPS control channel in sufficient time to receive incoming paging signals indicative of incoming AMPS communications. Thus, the M-ES does not need to remain on the CDPD channel for the entire time period specified by T203. However, the M-ES runs only a very small risk of either being de-registered from the CDPD network or losing the proper CDPD data stream (if more than 2 CDPD data streams are used in the present cell).

To facilitate the optimal performance of the M-ES, the configuration timer should be established for a long duration period (preferably an hour or more). A longer configuration time or duration period will result in a reduced risk of losing incoming AMPS calls because the configuration timer operates less often.

Although a number of arrangements of the present invention have been mentioned by way of example, it is not intended that the invention be limited thereto. Nevertheless, it will be understood that various modifications may be made without departing from the spirit and scope of the invention. For example, the present invention can be adapted for use with a variety of different parameter values and administrative environments. Also, the alternate communications mode to the CDPD mode need not be "AMPS". Rather, other types of data communication can be used without departing from the scope of the present invention. For example, the present invention could be used in an M-ES which concurrently monitors activities in both CDPD and IS-54, IS-136, CDMA, GSM, DECT, etc. Accordingly, it is understood that the invention is not to be limited by the specific illustrated embodiment, but only by the scope of the appended claims.

What is claimed is:

1. A method for concurrently monitoring communications in a first cellular communication system and a second cellular communication system, comprising the steps of:
   a. registering a wireless subscriber station for communication in both the first and the second communication systems;
   b. communicating in the first system until there is a lack of activity in the first system for a first predetermined time period;
   c. entering a sleep mode in the first system;
   d. communicating in the second system for a second predetermined time period; and
   e. exiting the sleep mode in the first system and proceeding to step b.

2. The method of claim 1, wherein the first communication system is a cellular digital packet data (CDPD) system.

3. The method of claim 1, wherein the second communication system comprises an analog mobile phone system (AMPS).

4. The method of claim 1, wherein the first predetermined time period is T203 seconds, and wherein a value for T203 is set by the subscriber station and received by the subscriber station using the first communication system.

5. The method of claim 1, wherein the second predetermined time period is a product of N204 and T204, and wherein values for N204 and T204 are received by the subscriber station over the first communication system.

6. The method of claim 1, wherein the sleep mode is exited by the subscriber station when the subscriber station transmits a polled receiver ready (RR) signal to the first communication system.

7. The method of claim 1, wherein the second communication system comprises a time division multiple access (TDMA) system.

8. The method of claim 1, wherein the first communication system comprises a code division multiple access (CDMA) system.

9. The method of claim 1, wherein the second communication system conforms with the IS-136 specification.

10. The method of claim 1, wherein the second communication system comprises a GSM communication system.

* * * * *